US012647452B2

(12) United States Patent
Bercovitz et al.

(10) Patent No.: US 12,647,452 B2
(45) Date of Patent: Jun. 2, 2026

(54) PARSING TECHNIQUES

(71) Applicant: Wiz, Inc., New York, NY (US)

(72) Inventors: Barak Bercovitz, Even-Yehuda (IL);
Bernie Pinkenzon-Howard, Tel Aviv
(IL); Eshel Yaron, Amsterdam (NL)

(73) Assignee: Wiz, Inc., New York, NY (US)

( * ) Notice: Subject to any disclaimer, the term of this
patent is extended or adjusted under 35
U.S.C. 154(b) by 0 days.

(21) Appl. No.: 19/195,139

(22) Filed: Apr. 30, 2025

(65) Prior Publication Data

US 2026/0095477 A1     Apr. 2, 2026

Related U.S. Application Data

(63) Continuation of application No. 18/901,462, filed on
Sep. 30, 2024.

(51) Int. Cl.
H04L 9/00          (2022.01)
G06F 40/30         (2020.01)
H04L 9/40          (2022.01)

(52) U.S. Cl.
CPC .......... H04L 63/1433 (2013.01); G06F 40/30
(2020.01); H04L 63/1425 (2013.01)

(58) Field of Classification Search
CPC ............................ G06F 40/30; H04L 63/1425
USPC .......................................................... 726/25
See application file for complete search history.

(56) References Cited

U.S. PATENT DOCUMENTS 7,783,610 B2     8/2010  Lin et al.
8,813,236 B1 *   8/2014  Saha ................... H04L 63/1408
                                                         726/25

10,304,444 B2    5/2019  Mathias et al.
12,339,765 B2 *  6/2025  Meenal Kathiresan .....................
                                                        G06F 40/40
2014/0325490 A1 * 10/2014  Wiener ..................... G06F 8/42
                                                         717/131
2021/0397793 A1   12/2021  Li et al.
2022/0222047 A1   7/2022   Todirel et al.
2023/0222511 A1   7/2023   Baghdasaryan et al.
2023/0297771 A1   9/2023   Peleg et al.
2024/0403290 A1   12/2024  Hawes et al.
2025/0080561 A1 * 3/2025   Dayan .................. H04L 63/20
2025/0209176 A1 * 6/2025   Palanki ................. G06F 21/577

FOREIGN PATENT DOCUMENTS

CN          116757199 A      9/2023

OTHER PUBLICATIONS

"API Bom." OX Docs, docs. ox.security/a-tour-of-ox/api-bom. Accessed
Sep. 30, 2024.

* cited by examiner

*Primary Examiner* — Christopher J Brown

(74) *Attorney, Agent, or Firm* — M&B IP Analysts, LLC

(57)              ABSTRACT

A system and method for parsing. A method includes que-
rying a language model based on a code sample in order to
obtain a second file, wherein outputs of the language model
are refined based on a comparison between a set of expected
results output by the language model for at least one set of
example code and at least one first parser output obtained by
inputting at least one first file to a parser; providing the
second file to the parser in order to obtain a second parser
output; and identifying at least one endpoint based on the
second parser output.

19 Claims, 8 Drawing Sheets

Compare results
250

200A

Input LLM query
210

Endpoint
Correlator
201

Language
Model
202

Output parser query
with samples
220

Input parser
query with
samples
230

Output
identified
endpoints
240

Parser
System
203

200B

600

Start

S610

Identify security finding indicating endpoint

S620

Identify endpoint correlation results

S630

Determine location of endpoint

S640

Identify root cause with respect to endpoint

S650

Alter code deployment for identified root cause

End

PARSING TECHNIQUES

CROSS-REFERENCE TO RELATED APPLICATIONS

This application is a continuation of U.S. patent application Ser. No. 18/901,462 filed on Sep. 30, 2024, now pending, the contents of which are hereby incorporated by reference.

TECHNICAL FIELD

The present disclosure relates generally to identifying endpoints in computing environments, and more specifically to artificial intelligence techniques for correlating endpoints with computing locations.

BACKGROUND

With the increasing size and complexity of computing environments, providing full visibility into endpoints within a given computing environment has become very challenging. Identifying endpoints within a computing environment may be relevant to securing the environment against cybersecurity threats. As a result, it would be desirable to provide solutions which allow for identifying endpoints in computing environments.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a method for parsing. The method comprises: iteratively refining outputs of a language model in a series of iterations until a set of expected results output by the language model at an iteration matches at least a portion of a parser output of a parser at the iteration, wherein each iteration includes: querying the language model using a query, wherein the query includes a target file structure to be output by the language model and a set of example code, wherein the language model outputs the file and a set of expected results; inputting a file to the parser in order to obtain a parser output; and comparing the set of expected results output by the language model to at least a portion of the parser output.

Certain embodiments disclosed herein also include a non-transitory computer readable medium having stored thereon causing a processing circuitry to execute a process, the process comprising: iteratively refining outputs of a language model in a series of iterations until a set of expected results output by the language model at an iteration matches at least a portion of a parser output of a parser at the iteration, wherein each iteration includes: querying the language model using a query, wherein the query includes a target file structure to be output by the language model and a set of example code, wherein the language model outputs the file and a set of expected results; inputting a file to the parser in order to obtain a parser output; and comparing the set of expected results output by the language model to at least a portion of the parser output.

Certain embodiments disclosed herein also include a system for parsing. The system comprises: a processing circuitry; and a memory, the memory containing instructions that, when executed by the processing circuitry, configure the system to: iteratively refine outputs of a language model in a series of iterations until a set of expected results output by the language model at an iteration matches at least a portion of a parser output of a parser at the iteration, wherein the system is further configured to, at each iteration: query the language model using a query, wherein the query includes a target file structure to be output by the language model and a set of example code, wherein the language model outputs the file and a set of expected results; input a file to the parser in order to obtain a parser output; and compare the set of expected results output by the language model to at least a portion of the parser output.

Certain embodiments disclosed herein include a method, non-transitory computer readable medium, or system as noted above or below, further including or being configured to perform the following step or steps: identifying the set of example code based on a plurality of example endpoints indicated in a set of cybersecurity findings, wherein the query utilized at each iteration is based on the identified set of example code.

Certain embodiments disclosed herein include a method, non-transitory computer readable medium, or system as noted above or below, wherein the parser is configured to parse streams of characters using grammar-based inputs.

Certain embodiments disclosed herein include a method, non-transitory computer readable medium, or system as noted above or below, wherein the parser further outputs a plurality of parse trees at each iteration, wherein the output of the parser at each iteration includes the plurality of parse trees output at the iteration.

Certain embodiments disclosed herein include a method, non-transitory computer readable medium, or system as noted above or below, wherein each iteration further includes, or a system is configured to perform at the iteration, the following step or steps: semantically analyzing the plurality of parse trees, wherein the at least a portion of the parser output which is compared to the expected results output by the language model is identified based on the semantic analysis of the plurality of parse trees.

Certain embodiments disclosed herein include a method, non-transitory computer readable medium, or system as noted above or below, wherein the query of each iteration includes a textual portion requesting that the language model output interpreter code, wherein the interpreter code includes instructions for semantically analyzing the plurality of parse trees, wherein each iteration further includes, or a system is configured to perform at the iteration, the following step or steps: executing the interpreter code output by the language model at the iteration, wherein the plurality of parse trees is semantically analyzed using the executed interpreter code.

Certain embodiments disclosed herein include a method, non-transitory computer readable medium, or system as noted above or below, wherein each iteration further includes, or a system is configured to perform at the iteration, the following step or steps: adding a postprocessing code to the file, wherein the postprocessing code includes instructions for semantically analyzing the plurality of parse trees, wherein the file with the added postprocessing code is input to the parser at the iteration.

Certain embodiments disclosed herein include a method, non-transitory computer readable medium, or system as noted above or below, wherein the file is a first file, further including or being configured to perform the following step or steps: querying the language model based on a code sample when the outputs of the language model have been iteratively refined in order to obtain a second file; providing the second file to the parser based on the second file in order to obtain a set of parser outputs for the code sample; and identifying at least one endpoint based on the set of parser outputs for the code sample.

Certain embodiments disclosed herein include a method, non-transitory computer readable medium, or system as noted above or below, further including or being configured to perform the following step or steps: remediating a vulnerability based on the identified at least one endpoint.

Certain embodiments disclosed herein include a method, non-transitory computer readable medium, or system as noted above or below, wherein remediating the vulnerability further comprises altering a code deployment for the identified at least one endpoint.

Certain embodiments disclosed herein include a method, non-transitory computer readable medium, or system as noted above or below, further including or being configured to perform the following step or steps: correlating at least one portion of the code sample with the at least one endpoint, wherein each endpoint is identified with respect to a location of the corresponding portion of the code sample.

Certain embodiments disclosed herein include a method, non-transitory computer readable medium, or system as noted above or below, further including or being configured to perform the following step or steps: adding a postprocessing code to the second file, wherein the postprocessing code includes instructions for semantically analyzing the parser outputs for the code sample, wherein the second file with the added postprocessing code is provided to the parser in order to obtain the set of parser outputs for the code sample.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
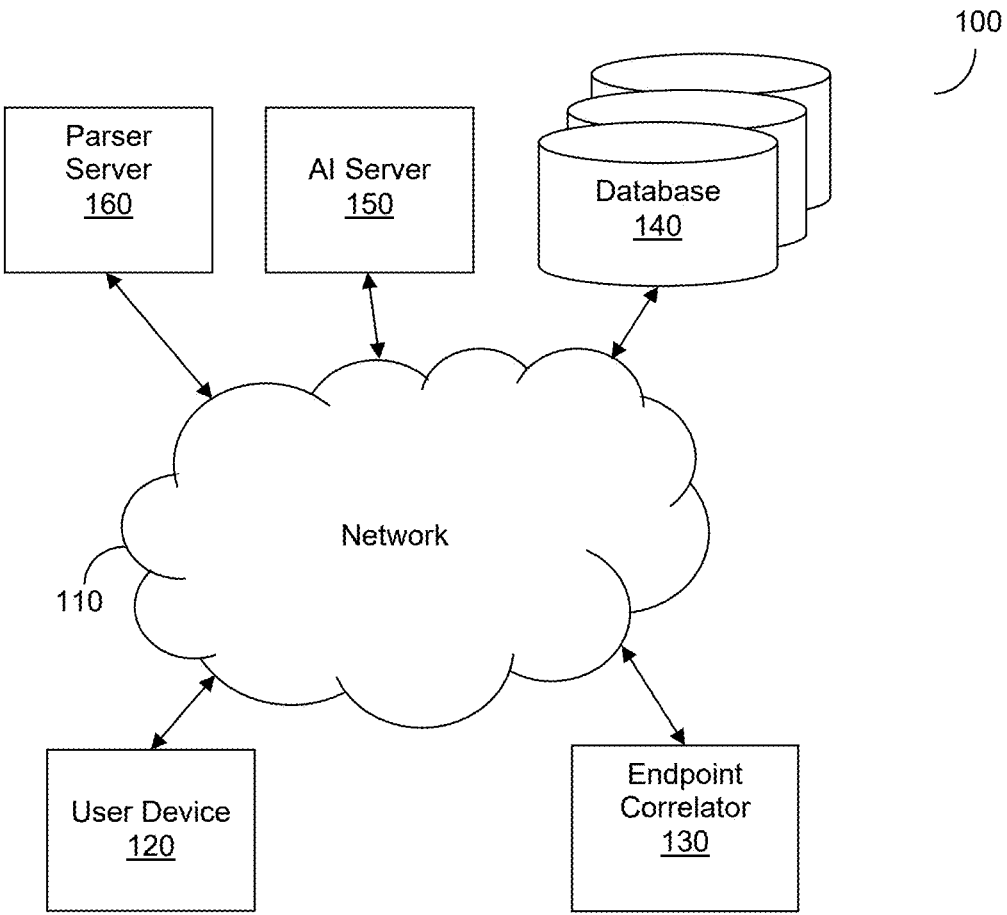
FIG. 1 is a network diagram utilized to describe various disclosed embodiments.

The various disclosed embodiments include techniques for endpoint correlation and for securing computing environments using endpoint correlation results. Various disclosed embodiments utilize language models such as large language models (LLMs) in order to create queries to be utilized as inputs to parsers, thereby allowing for automatically parsing code in order to identify endpoints indicated therein. Moreover, various disclosed embodiments include techniques for iteratively refining parser queries which may allow for automatically self-testing the outputs of the language model, thereby improving accuracy of endpoint identification using the parser queries.

In an embodiment, a language model is queried using a language model query including a query portion (e.g., a predetermined portion including text of a question or query), a target file structure of a file to be output by the language model, and a set of code to be analyzed for endpoints. The resulting output by the language model includes a query for a parser and the set of code to be parsed. The output of the language model is used to query a parser, which returns a set of endpoints identified within the set of code. The identified endpoints may be used, for example, for endpoint discovery, to remediate vulnerabilities (e.g., by identifying a location of an endpoint which is the root cause of a vulnerability), and the like.

In a further embodiment, in order to prompt the language model to generate outputs suitable for use in parser queries, the language model is iteratively refined using a process including querying the language model and using the query results from the language model in order to query the parser. To this end, in such an embodiment, the language model is queried using a query including an example format or structure of a target output file and text indicating a request to generate outputs including a prompt, code samples indicating endpoints according to certain code frameworks, and expected results of parsing the code including the endpoints indicated within the code samples. The outputs of the language model are used to query the parser, and the parser returns data such as parser trees indicating a set of endpoints identified in the code samples. The identified endpoints included among the outputs of the parser are compared to the expected results output by the language model in order to determine whether the respective outputs match, for example, whether the outputs of the parser include all of the endpoints indicated in the expected results from the language model.

In such an embodiment, when the outputs do not match between the parser outputs and the expected results output by the language model, a new query may be generated and input to the language model. The new query may prompt the language model to generate a different set of outputs and may indicate that the previous outputs did not yield a matching set of endpoints. At each iteration, the language model may be queried for outputs to be used for a new query to the parser, and the parser may be queried. The result is that, once the endpoints indicated in the expected results output by the language model match the endpoints identified by the parser, the language model queries have been iteratively refined and are ready to use on a set of code to be analyzed for endpoints.

In some embodiments, security findings (e.g., findings output by cybersecurity tools) may be utilized to further improve accuracy of the endpoint identification, for example by allowing for creating a wider variety of code samples via the language model, for creating code samples which are tailored to a given computing environment (e.g., having endpoint identifier structures which reflect structures observed within the computing environment), both, and the like. In this regard, such cybersecurity findings may be utilized to further improve the accuracy of parsing, which in turn may reduce the number of false positives and false negatives.

The disclosed embodiments therefore provide techniques which allow for creating a closed feedback loop in order to generate queries for a parser. This closed feedback loop may be performed without human intervention during iterations, that is, without requiring a human to manually inspect the outputs of the parser and comparing them to the code. In this regard, it is noted that manual solutions for identifying endpoints rely on human evaluation of code, which may be subjective and can therefore lead to results which vary depending on the person performing endpoint identification. The disclosed embodiments provide an objective, automated process, which may allow for more consistently and accurately identifying endpoints within code.

Additionally, the disclosed embodiments allow for identifying locations of endpoints with high granularity. As discussed herein, by identifying specific locations within code (e.g., lines of code) where endpoints are indicated, a location of each endpoint may be identified with high granularity. Further, specific lines of code indicating endpoints may be used to identify locations within a set of code (e.g., a column), certain sets of code (e.g., code files), a code repository or other storage, and the like containing each endpoint. Such high granularity identification of endpoint location may improve visibility into the computing environment when used for discovery purposes, and may improve cybersecurity of the computing environment when used to determine where remediation actions are to be performed.

In this regard, it has been identified that LLMs and other language models demonstrate high performance in pattern recognition activities, and that such pattern recognition is particularly relevant for analyzing code since code tends to be written using repeated patterns, both between different coders and in particular when written by the same coder.

Moreover, because many LLMs can be interacted with over multiple communications in order to query for different outputs, it has been identified that techniques which allow for automatically checking results of LLM outputs may be utilized to effectively automate refinement. That is, it has been identified that subsequent queries to the LLM may be automated based on objective criteria for success such as checking a list of endpoints indicated among outputs of a LLM against endpoints identified using parsing based on outputs of a parser created by applying the parser to a query including outputs of the LLM. This, in turn, allows for providing parser queries which yield more accurate endpoint identification as compared to parsing without AI-based queries or without refining AI queries, and for performing such AI-generated query refinement without requiring manual intervention.

Further, it has been identified that certain existing solutions for identifying endpoints may allow for identifying endpoints in code written using certain code frameworks, for example by manually coding instructions for particular frameworks. However, these solutions must be defined framework-by-framework, and cannot be applied to new frameworks in order to accurately identify endpoints. As a result, such solutions are effectively limited to only certain predefined code frameworks. Various disclosed embodiments leverage properties of language models, and in particular large language models, to evaluate patterns in code for existing code frameworks in order to enable parsing new, unknown, or otherwise not explicitly contemplated frameworks. Various disclosed embodiments may allow for identifying endpoints more accurately than at least some existing solutions which use explicitly predefined frameworks.

In addition to benefits in accuracy of endpoint correlation, various disclosed embodiments may allow for improving LLM outputs to be used for endpoint correlation more efficiently. Various disclosed embodiments provide techniques for query refinement which may be realized using a general-purpose LLM or otherwise using a LLM which has not been fine-tuned for use in accordance with the disclosed embodiments. Accordingly, such embodiments may be realized without requiring fine-tuning or otherwise further training of the LLM being used to generate queries for the parser. Because training requires significant amounts of training resources, particularly as compared to simply re-querying a previously trained model, various disclosed embodiments may result in improved LLM outputs more efficiently than improving LLM outputs via fine-tuning or otherwise via more training.

Additionally, as discussed herein, certain embodiments include using the results of endpoint identification in order to remediate cybersecurity vulnerabilities. In such an embodiment, an endpoint indicated in an alert or otherwise an endpoint which has been determined to be vulnerable is analyzed with respect to correlation results in order to determine a location of the endpoint. Code deployment at the determined location is modified in order to remediate the vulnerability, for example by changing a line of code, swapping a file for a different version or other file, and the like.

FIG. 1 shows an example network diagram 100 utilized to describe the various disclosed embodiments. In the example network diagram 100, a user device 120, an endpoint correlator 130, a plurality of databases 140-1 through 140-N (hereinafter referred to individually as a database 140 and collectively as databases 140, merely for simplicity purposes), an artificial intelligence (AI) server 150, and a parser server 160 communicate via a network 110. The network 110 may be, but is not limited to, a wireless, cellular or wired network, a local area network (LAN), a wide area network (WAN), a metro area network (MAN), the Internet, the worldwide web (WWW), similar networks, and any combination thereof.

The user device 120 may be, but is not limited to, a personal computer, a laptop, a tablet computer, a smartphone, a wearable computing device, or any other device capable of receiving and displaying notifications. The user device 120 may be configured to send requests for endpoint identification (e.g., to the endpoint correlator 130), receive notifications indicating identified endpoints or requesting remediation actions be performed (e.g., from the endpoint correlator 130), and the like.

The endpoint correlator 130 is configured to correlate endpoints as described herein, and may further be configured to remediate cybersecurity threats using endpoint correlation as described herein. In accordance with various disclosed embodiments, the endpoint correlator 130 is configured to utilize a language model (e.g., a language model hosted on or otherwise accessible to the AI server 150) in order to query a parser (e.g., a parser hosted on or otherwise accessible to the parser server 160), and to utilize outputs of the parser I in order to correlate endpoints as described herein.

The databases 140 may store data such as, but not limited to, data related to a computing environment (not shown), and in particular data including code within the computing environment to be analyzed in order to identify endpoints as discussed herein. To this end, the databases 140 may be or may store data of one or more code repositories. As discussed herein, endpoints may be correlated to locations within the code repositories as part of endpoint identification.

The AI server 150 includes or is otherwise configured to access one or more AI models. In accordance with various disclosed embodiments, such AI models include one or more language models. Such a language model is trained to at least provide textual outputs in response to inputs. Further, in at least some embodiments, the language models include one or more large language models (LLMs). A LLM is an artificial neural network which utilizes a transformer architecture, where a transformer architecture is a deep learning architecture using an attention mechanism to contextualize text which has been converted into numerical representations in the form of tokens. More specifically, a LLM is trained on a large amount of text in order to train the model for language-related tasks such as, but not limited to, language generation. In accordance with various disclosed embodiments, text generated via a LLM is utilized to create inputs to a parser generator tool.

The parser server 160 includes, is configured to generate, or is otherwise configured to access one or more parsers. Such a parser is configured to match a sequence of characters against the input grammar. Outputs of such a parser may include, but are not limited to, a parse tree which illustrates how grammar productions expand into a sentence matching a character sequence. The parse tree may be utilized in accordance with various disclosed embodiments in order to identify lines of code containing endpoints, which in turn may be utilized for endpoint correlation as described herein. To this end, in various disclosed embodiments, the LLM is queried in order to produce outputs which include grammar productions representing example representations of endpoints in code (e.g., grammar productions corresponding to target semantic definitions of endpoints in accordance with a given framework), which may be utilized by the parser in order to identify sequences of characters corresponding to the endpoint grammar.

In some embodiments, the parser is previously generated or otherwise predetermined. In other embodiments, the parser may be generated via a parser generator tool (not shown). To this end, in such embodiments, the parser server 160 may include or otherwise be configured to access such a parser generator tool. Such a parser generator tool is configured to generate source code containing instructions that, when executed by a processor, configure the processor to parse streams of characters using grammar-based inputs. That is, the generated source code acts as a parser which is configured to match a sequence of characters against the input grammar.

It should be noted that FIG. 1 depicts an implementation of various disclosed embodiments, but that at least some disclosed embodiments are not necessarily limited as such. Other deployments, arrangements, combinations, and the like, may be equally utilized without departing from the scope of the disclosure. In particular, any of the endpoint correlator 130, the AI server 150, and the parser server 160 may be integrated into a single system without departing from the scope of the disclosed embodiments. In such embodiments, the endpoint correlator 130 may be further configured with an AI model such as a language model, with a parser generator, or both.

Figure 2A:
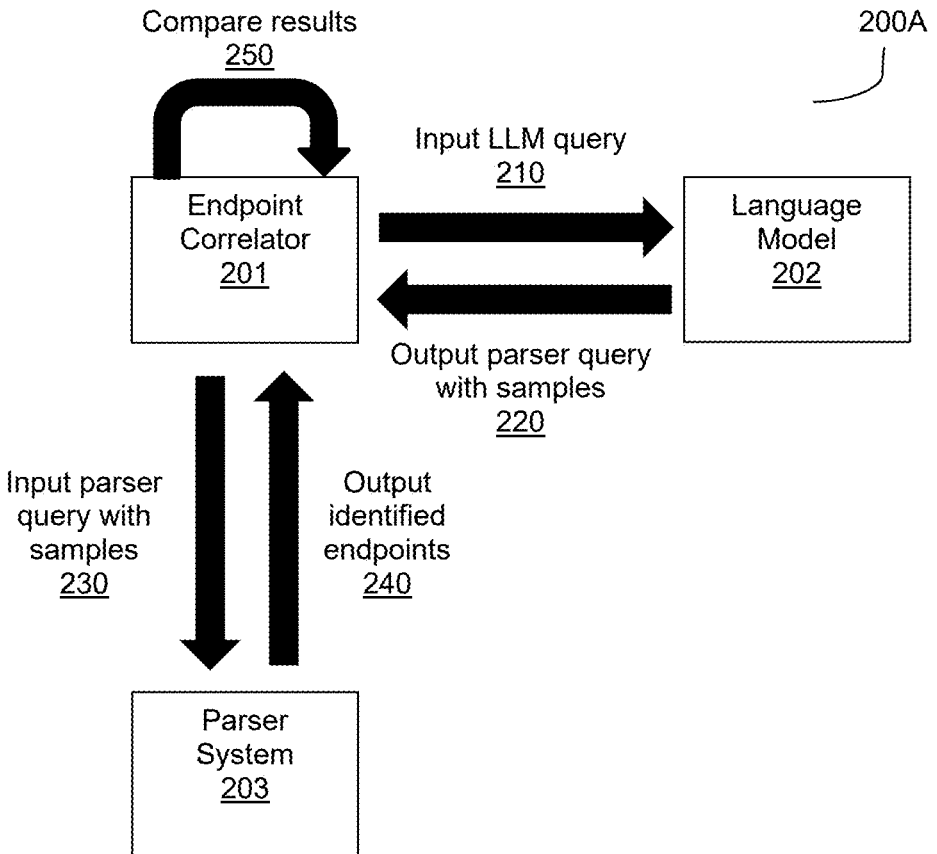
FIGS. 2A-B are example flow diagrams illustrating query refinement and utilization in accordance with various disclosed embodiments.
Figure 2B:
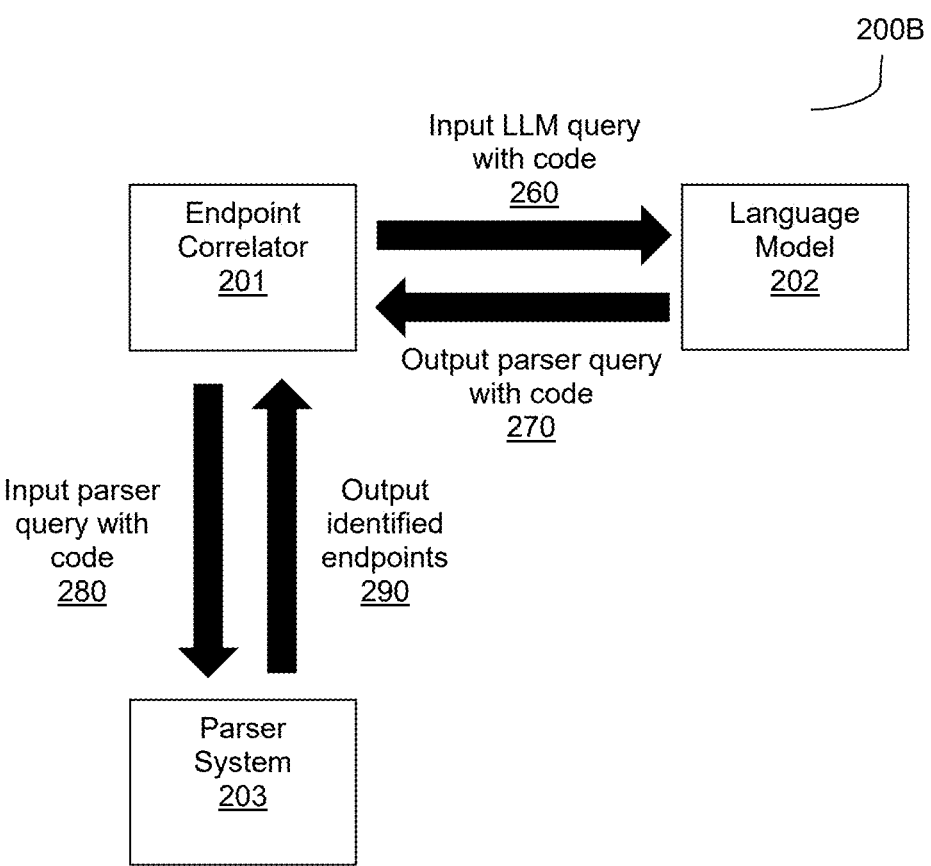

FIGS. 2A-B are example flow diagrams 200A and 200B, respectively, illustrating query refinement and utilization in accordance with various disclosed embodiments.

As illustrated in FIG. 2A, an endpoint correlator 201 communicates with a language model 202 and a parser system 203. In an embodiment, the language model 202 is a large language model (LLM) trained to output text in response to textual inputs. In an embodiment, the parser system 203 is or includes one or more parsers configured to parse streams of characters using grammar-based inputs. In a further embodiment, the parser system 203 is or is configured to access a parser generator tool (not shown) configured to generate source code for parsing streams of characters using grammar-based inputs. The example flow diagram 200A illustrates a process for refining outputs of the language model 202 in order to improve parsing performed by the parser system 203.

At 210, the endpoint correlator provides an input LLM query to the language model 202. In an embodiment, the input LLM query includes an example format or structure of a target output file and text indicating a request to generate outputs. More specifically, the request-indicating text may indicate that the outputs of the LLM should include components such as, but not limited to, a prompt, code samples indicating endpoints according to certain code frameworks, and expected results of parsing the code including the endpoints indicated within the code samples. The language model 202 outputs a parser query with samples at 220, where the parser query includes any requested components input to the language model 202.

At 230, the endpoint correlator 201 provides the parser query with samples output by the language model 202 to the parser system 203. In response, the parser system 203 applies a parser in order to output a set of endpoints identified within the code included among the parser query samples and provides the output identified endpoints to the endpoint correlator 201 at 240.

At 250, the endpoint correlator 201 compares results among the output endpoints provided by the parser system 203 against the expected results included among the parser query provided by the language model 202 at 220. Based on the comparison, the endpoint correlator 201 determines whether the results match and, if so, the outputs coming from the language model 202 may be determined as sufficiently refined. Otherwise, flow may continue with another iteration of steps 210 through 250 which begin with a new LLM query being provided to the language model 202. In some embodiments, results may match when all endpoints included in a set of expected results output by the language model 202 are included in the set of identified endpoints output by the parser system 203.

The new LLM query may include predetermined text corresponding to a result of failure to match. As a non-limiting example, such a predetermined text for a new LLM query may be "The last parser query did not result in the parser successfully identifying all endpoints. Create a new parser query with additional examples of endpoint structures." As another non-limiting example, the text of the new LLM query may be or may include "The last parser query did not result in the parser successfully identifying all endpoints. Create a new parser query with different examples of endpoint structures." The new LLM query may be provided during the same session as one or more previous LLM queries, or otherwise provided in connection with such previous LLM queries in order to refine the outputs of the LLM over a series of LLM queries.

The new LLM query will result in a new parser query with samples from the language model 202, and the new parser query is provided to the parser system 203 in order to obtain a new set of identified endpoints, which are then compared to expected results included among the new parser query in order to determine whether the results match (and, consequently, whether additional iterations are to be performed).

As illustrated in FIG. 2B, once any refinement has been performed, the language model 202 is queried in order to create a parser query for a set of code to be analyzed for endpoints (i.e., a set of code for which endpoint correlation is desired). In an embodiment, a LLM query provided as an input at 260 includes a predetermined portion, a target file structure of a file to be output by the language model, and a set of code to be analyzed for endpoints. The resulting output received from the language model 202 at 270 is a parser query including a set of code to be parsed (i.e., the set of code to be analyzed for endpoints).

The parser query including the set of code to be parsed is input to the parser system 203 at 280. The parser system 203 returns an output set of identified endpoints at 290. The identified endpoints provided at 290 may identify the endpoints, for example, with respect to portions of code. As a non-limiting example, a line of code indicating each identified endpoint is included among the outputs. Such lines of code or other portions of code may be utilized to pinpoint a location of each endpoint within a computing environment, which in turn may aid in discovery (e.g., discovering endpoints within the computing environment), remediation (e.g., remediating vulnerabilities using locations of endpoints involved in those vulnerabilities), and the like.

Figure 3:
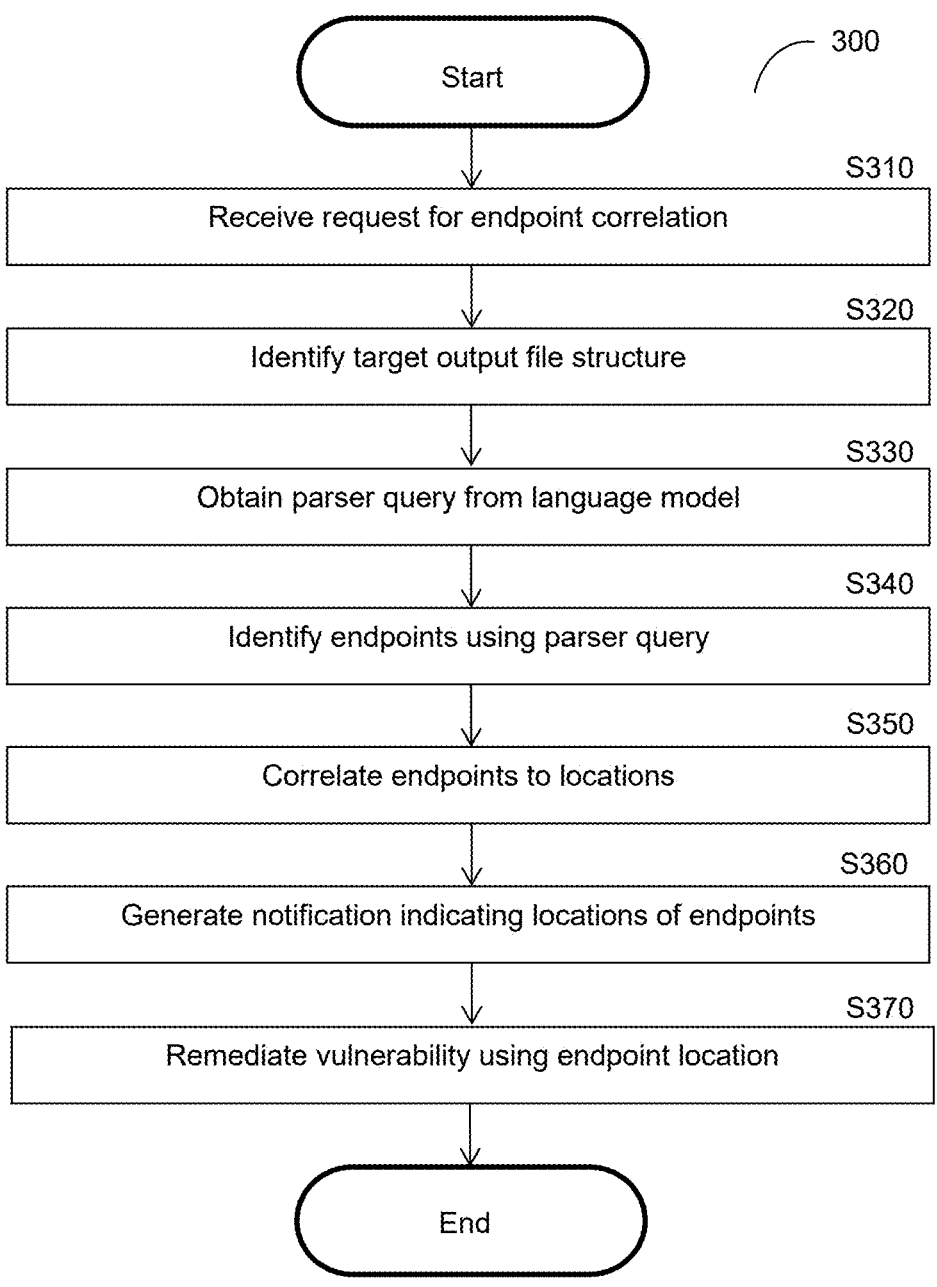
FIG. 3 is a flowchart illustrating a method for endpoint correlation according to an embodiment.

FIG. 3 is a flowchart 300 illustrating a method for endpoint correlation according to an embodiment. In an embodiment, the method is performed by the endpoint correlator 130, FIG. 1.

At S310, a request for endpoint correlation may be received. The request may be received from, for example but not limited to, a user device (e.g., the user device 120, FIG. 1). The request may indicate, for example, a computing environment for which endpoints are to be identified and correlated with respective locations within the computing environment. Alternatively or additionally, the request may include or point to a location in storage of a set of code to be analyzed pursuant to endpoint correlation.

At S320, a target output file structure is identified. The target output file structure is utilized to define a structure for the output of the language model, that is, to be provided as inputs to the language model demonstrating what the structure of the outputs should be like. The target output file structure may be a predetermined structure, and may be defined based on, for example, the parser which will be provided the output file as an input (e.g., by defining the target output file structure based on a file structure of a file type used by the parser). As a non-limiting example, when the parser accepts inputs in the form of configuration files (e.g., a YAML file), the target output file structure may be a file structure of such a configuration file.

At S330, a parser query is obtained from a language model. In an embodiment, the language model is queried using a query including a query portion including text indicating a question or request, a target output file structure, and a set of code to be analyzed with respect to endpoints indicated therein.

In a further embodiment, outputs of the language model are refined over a series of iterations. In such an embodiment, at each iteration, outputs of a parser resulting from providing outputs of the language model as inputs are compared to expected results indicated among the outputs of the language model in order to determine whether the results match. When the results do not match, a subsequent query is provided to the language model in order to prompt the language model to provide a different parser query in an effort to create a parser query which will yield matching results among outputs of the parser as compared to expected results indicated in the new parser query.

An example process which may be utilized to obtain a parser query from a language model is described in more detail below with respect to FIG. 4.

At S340, one or more endpoints are identified using the parser query. In an embodiment, identifying the endpoints includes providing the parser query as an input to a parser. Such a parser is configured to match a sequence of characters against the input grammar. Outputs of such a parser may include, but are not limited to, a parse tree which illustrates how grammar productions expand into a sentence matching a character sequence. The parse tree may be utilized in accordance with various disclosed embodiments in order to identify lines of code containing endpoints, which in turn may be utilized for endpoint correlation as described herein.

In an embodiment, identifying the endpoints further includes performing semantic analysis with respect to outputs of the parser. In this regard, it is noted that accurately matching patterns in endpoint-identifying data is a challenge which is demonstrated both in syntax and in semantics such that semantically analyzing outputs of the parser provides additional context on top of the syntactic analysis which may further improve the identification of endpoints.

In an embodiment, the parser may be a previously generated or otherwise predetermined parser. In another embodiment, identifying the endpoints further includes generating the parser using a parser generator tool. To this end, in a further embodiment, identifying the endpoints includes providing the parser query as an input to a parser generator tool. The parser generator tool generates a parser and applies the parser to parse code in order to provide a set of outputs including portions of the code (e.g., lines) having grammar structures (e.g., code syntax) matching those of example code structures (e.g., examples of endpoint identifier structures) provided to the parser generator tool as inputs. Accordingly, the outputs of the parser generator tool in such an embodiment include a set of code portions corresponding to respective endpoints when the example structures provided to the parser generator tool are example structures of endpoint identifiers (e.g., structures of network addresses or other network locations). These code portions identify their respective endpoints.

Each identified endpoint is a component of a computing environment which connects to and communicates data via one or more computer networks such that the endpoint acts as an end of a communication channel. To this end, each endpoint may be a server or other hardware component, a service or other logical component, and the like. Endpoints may be particularly relevant components to manage for cybersecurity purposes such that discovering endpoints and identifying which endpoints are being used to exploit vulnerabilities may allow for improving security within a computing environment. That is, because endpoints open up communications between systems within the computing environment with external systems via communication channels, endpoints act as entry points into the computing environment. An endpoint may be identified in code with respect to a network address or other network location. As a non-limiting example, an endpoint may be represented in code as "string/login/user/joendpoint."

In some embodiments, the parser query is enriched using postprocessing code. To this end, in such an embodiment, a script including the parser query and such postprocessing code is generated. In a further embodiment, the postprocessing code includes instructions that, when executed by a processing circuitry, configure the processing circuitry to semantically analyze outputs of a parser. More specifically, in yet a further embodiment, the postprocessing code includes instructions for semantically analyzing syntax trees.

At S350, the identified endpoints are correlated to respective locations in a computing environment. More specifically, network locations (e.g., network addresses) of the identified endpoints are correlated to locations of code which reference those network locations. The locations of code may be defined with respect to, for example but not limited to, lines of code, certain files containing code, code repositories including the code, databases or other components storing those code repositories, combinations thereof, and the like. Accordingly, this correlation between network locations and code locations allows for associating certain portions of code or repositories which store those portions of code with calls to endpoints, i.e., such that the portion of code which calls a given endpoint is identified as effectively exposing the computing environment to a communication channel via that endpoint.

At optional S360, a notification indicating the locations of the identified endpoints may be generated and sent, for example, to a user device (e.g., the user device 120, FIG. 1). Such a notification may be used, for example, by a user of such a user device in order to make decisions about securing a computing environment including the identified endpoints or otherwise to gain insight into which endpoints exist within such a computing environment.

At S370, a vulnerability is remediated using the location of one or more of the identified endpoints. In an embodiment, remediating the vulnerability includes identifying a root cause with respect to the endpoints. More specifically, in a further embodiment, the root cause is identified as one of the identified endpoints (e.g., as a root cause endpoint). In yet a further embodiment, the location correlated to the root cause endpoint is identified as a location of the root cause, and one or more remediation actions are performed at, on, or otherwise with respect to the computing component deployed at that location. To this end, in an embodiment, remediating the cyber event further includes determining, based on the identified root cause, which remediation steps to apply, where to apply remediation steps (e.g., to the computing component deployed at the location identified for the root cause endpoint), or both.

In an embodiment, remediating the vulnerability with respect to the computing component deployed at the location of the root cause endpoint includes altering a code deployment of at least a portion of code associated with the identified endpoint or otherwise used by or used to realize the computing component. That is, in an embodiment, remediating the vulnerability includes altering deployment of code at the location of the root cause endpoint. To this end, remediating the vulnerability may include, but is not limited to, removing code of a software component (e.g., code containing a vulnerable line which references the endpoint indicated in the security finding), rebuilding one or more software containers (e.g., a software container used by the computing component) or otherwise redeploying the computing component or a portion thereof, updating software (e.g., replacing software used by the computing component with a new version of the software containing new code), combinations thereof, portions thereof, and the like.

Alternatively or additionally, remediating the vulnerability may include performing one or more other actions with respect to the location of the root cause endpoint. Such other actions may include, but are not limited to, blocking traffic to or from that computing component, reconfiguring the computing component, both, and the like.

An example process for remediating a vulnerability using endpoint correlation results which may be utilized at S370 is described further below with respect to FIG. 6.

Figure 4:
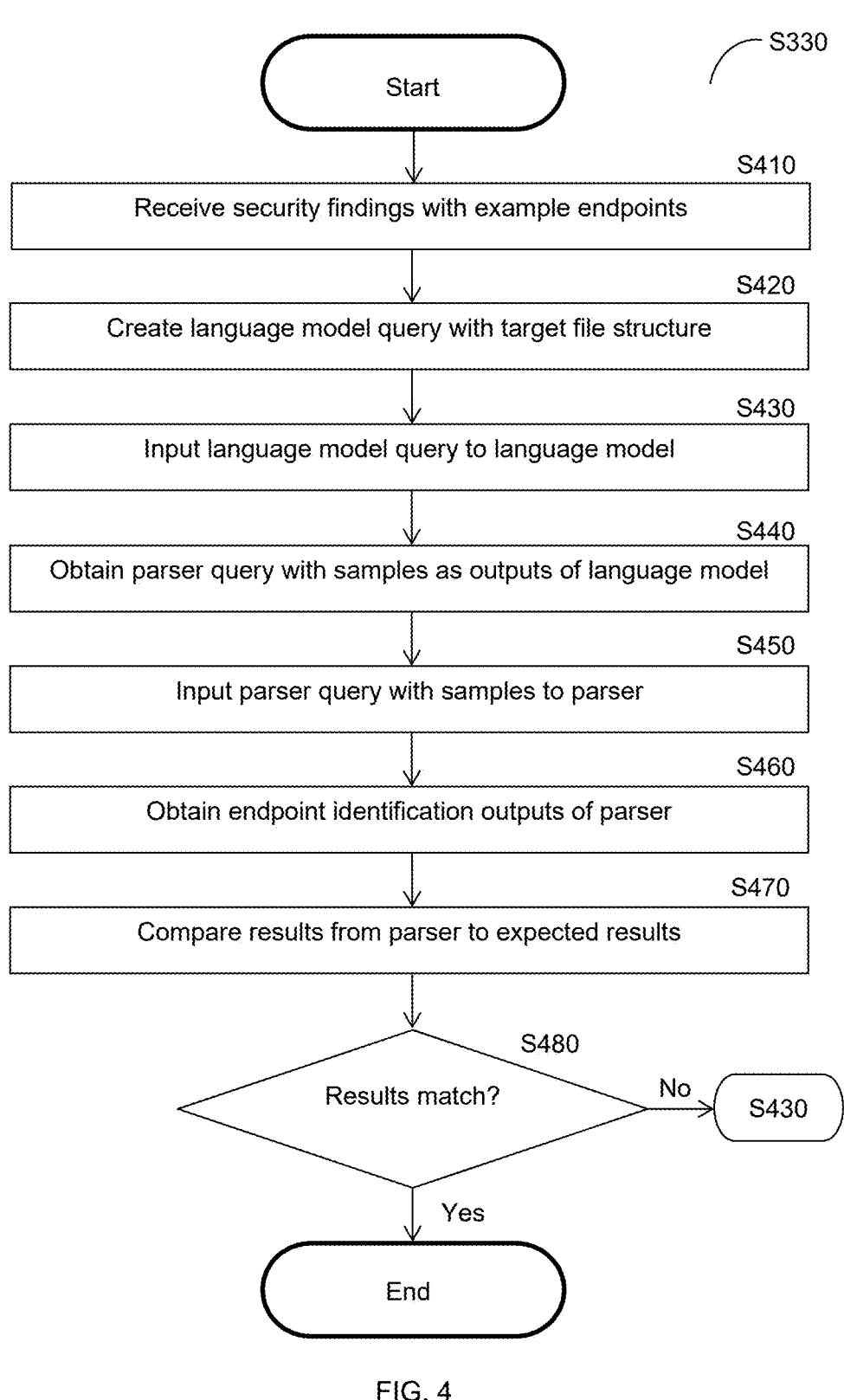
FIG. 4 is a flowchart illustrating a method for refining a query to a parser according to an embodiment.

FIG. 4 is a flowchart S330 illustrating a method for refining a query to a parser according to an embodiment. The process illustrated in FIG. 4 may be utilized to automate query refinement by providing a process for self-testing query performance which leverages interactions between a language model such as a LLM and a parser to self-refine the language model without requiring manual intervention by a human operator. To this end, the process of FIG. 4 provides steps for testing performance of the LLM using comparison between certain outputs of the LLM and of the parser which allow for objectively, automatically, determining whether further iterations are to be performed.

At optional S410, a set of cybersecurity findings, or security findings, with example endpoints is received. The security findings may be or may include alerts or other outputs of cybersecurity tools which indicate cyber threats detected, for example, in a given computing environment. Such security findings may include identifying information for potential components involved in cybersecurity events, such as endpoints which were used to access other resources or which were otherwise involved in a cyber-attack.

More specifically, the security findings may indicate endpoints having code stored in known locations within a computing environment such that code samples for each of the endpoints indicated within the security findings may be created based on code associated with the respective known locations of the endpoints.

Using cybersecurity findings in order to identify additional sources of potential code samples may allow for providing more examples of code to be used for language model refinement, which in turn may allow for refining language model queries to better reflect structure of code used within the computing environment. This refinement may reduce the number of false positive and false negative results of subsequent endpoint identification using parsing as discussed herein.

At S420, a first language model query with a target file structured is created. In an embodiment, the language model query includes a query portion (e.g., a predetermined portion including text of a question or query), a target file structure of a file to be output by the language model, and one or more sets of code to be analyzed for endpoints. In a further embodiment, the query portion includes text indicating a request to generate a parser query. Such a query portion may be, but is not limited to, a predetermined portion of text such as "Write a parser query in the following target file structure based on the following sets of code . . . ."

The target file structure may be a predetermined structure or format of an output file which should be output by the language model. In a further embodiment, the target file structure includes or otherwise indicates a portion for expected results such that the language model, when outputting text according to the target file structure based on code demonstrating example endpoints, will also output a set of expected results in the form of a list or other set of endpoints which are indicated in the code (and, consequently, which should be identified by the parser assuming that the parser query provided to the parser is optimized correctly). As discussed below, these expected results allow for automating evaluation of the language model's performance in creating parser queries, which in turn allows for automatically refining the language model outputs by continuing to query the language model until it provides outputs that achieve a suitable result.

When security findings to be used for refining the language model are received, code associated with the example endpoints indicated in those security findings may be included among the sets of code to be analyzed for endpoints. To this end, in an embodiment, creating the language model query further includes retrieving or otherwise identifying code associated with the example endpoints indicated in the received security findings. Otherwise (e.g., when no security findings are provided), the code examples may be obtained from a repository or may be received (e.g., from a user device).

At S430, the language model query is input to a language model such as a large language model (LLM). In response, the language model outputs a file to be used as a parser query or otherwise to be used to generate the parser query, where the file is formatted according to the target file structure which includes code samples from among the example code provided in the language model query. At each iteration, the file output by the language model may be a first file among multiple first files (i.e., a first file for each iteration). Once the language model has been iteratively refined, the language model may be subsequently queried using new code in order to output a second file to be used for querying a parser in order to analyze the new code.

At S440, outputs of the language model including a file to be used as a parser query or portion thereof with code samples to be parsed are obtained. In an embodiment, the outputs of the language model further include one or more expected results of endpoints which should be identified by parsing the code samples included in the parser query. As discussed below, such expected results may be compared to results from the parser as applied to the parser query in order to determine whether a current iteration of parser queries being generated by the language model are capable of causing the parser to accurately identify endpoints.

In an embodiment, the language model is queried in order to produce outputs which include grammar productions representing example representations of endpoints in code (e.g., grammar productions corresponding to target semantic definitions of endpoints in accordance with a given framework), which may be utilized by the parser in order to identify sequences of characters corresponding to the endpoint grammar. In a further embodiment, the example representations of endpoints in the code are determined by the language model based on the example code provided as inputs to the language model.

At S450, the parser query is input to a parser. The parser is configured to parse streams of characters using grammar-based inputs.

In some embodiments, S450 includes providing the parser query as input to a parser generator tool (also referred to as a parser generator). Such a parser generator may be or may include a parser generator tool configured to generate source code containing instructions that, when executed by a processor, configure the processor to parse streams of characters using grammar-based inputs. That is, the generated source code acts as a parser which is configured to match a sequence of characters against the input grammar.

Outputs of the parser may include, but are not limited to, parse trees which each illustrate how grammar productions expand into a sentence matching a character sequence. The parse trees may be utilized in order to identify lines of code containing endpoints, which in turn may be utilized for endpoint correlation as described herein.

At S460, outputs indicating endpoints identified within the parsed samples are obtained from the parser. As noted above, such outputs may be or may include a parse tree demonstrating how lines of code represent endpoints therein. To this end, in an embodiment, S460 further includes identifying such lines of code which indicate endpoints based on the parse trees.

At S470, the endpoints indicated in the outputs of the parser are compared to the expected results indicated in the outputs of the language model.

At S480, it is determined whether the results compared at S470 match and, if so, execution terminates; otherwise, execution continues with S430. The results may match when, for example, all endpoints among the expected results are indicated in the outputs of the parser. Alternatively, when the results match above a threshold (e.g., a threshold number or proportion of matched endpoints), the results may be determined to match.

When the results do not match, execution may continue with S430 where a new language model query is input to the language model. The new language model query may be, but is not limited to, a predetermined query including text requesting a modified or otherwise alternate version of the parser query using the same target file structure and example code. In this regard, the language model may be queried in order to cause the language model to continue refining its parser queries until the parser query output by the language model yields a match with subsequent results from the parser. Once the language model's outputs have been refined so as to obtain matching results, code may be subsequently input to the language model in order to obtain a parser query which will yield accurate endpoint identification when the parser query is input to a parser. In some embodiments, the new language model query may include error data indicating, for example, differences between the expected results output by the language model and outputs indicating endpoint determined via the parser. This error data may further improve the language model's file generation, and may allow for producing a suitable file more efficiently (e.g., in fewer iterations).

As noted above, by using the expected results from the language model and comparing them to actual results output by the parser, the parser query utilized as an input to the parser may be analyzed in an accurate and objective manner which may be performed automatically without requiring manual evaluation of endpoint identification.

Figure 5:
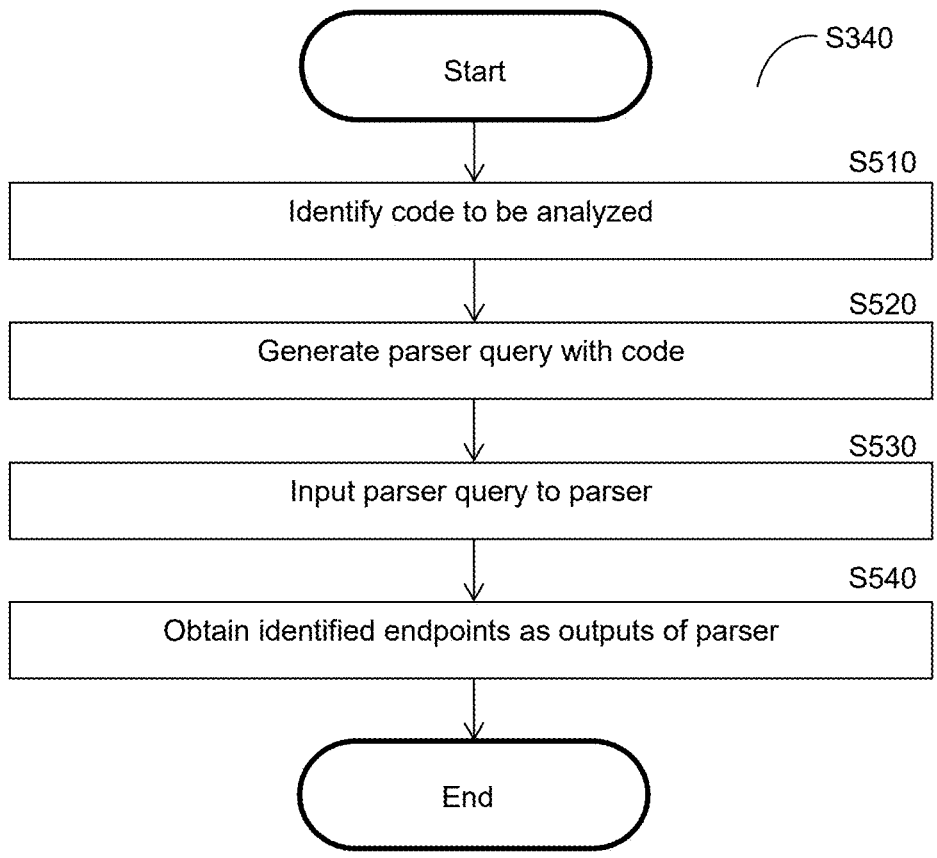
FIG. 5 is a flowchart illustrating a method for identifying endpoint location via parsing according to an embodiment.

FIG. 5 is a flowchart S340 illustrating a method for identifying endpoint location via parsing according to an embodiment.

At S510, code to be analyzed is identified. The code to be analyzed may be or may include, but is not limited to, code deployed in a computing environment. As discussed herein, code of the computing environment may be analyzed as described herein in order to identify endpoints, which may in turn be utilized to secure the computing environment against cyber threats or otherwise allow for discovering endpoints which might expose the computing environment to more vulnerabilities.

At S520, a parser query is generated based on the code to be analyzed. In an embodiment, the parser query has a first portion including text of the code to be analyzed (e.g., the code in text format) as well as a second portion including text of a query (e.g., text such as "Parse the following code . . . ").

At S530, the parser query is input to a parser. The parser is configured to parse streams of characters using grammar-based inputs.

In some embodiments, S530 includes providing the parser query to a parser generator tool (also referred to as a parser generator). Such a parser generator tool is configured to generate source code containing instructions that, when executed by a processor, configure the processor to parse streams of characters using grammar-based inputs. That is, the source code generated by the parser generator acts as the parser, and the parser generator tool may apply the parsed by providing the parser query to the parser as an input.

At S540, outputs of the parser indicating or otherwise identifying endpoints found in the code to be analyzed are obtained. Outputs of such a parser may include, but are not limited to, a parse tree which illustrates how grammar productions expand into a sentence matching a character sequence. For example, the outputs may indicate different portions of code representing different parts of code structure, with at least some of the parts of code structure represented in these parse trees including portions of code representing endpoint identifiers. In some embodiments, S540 further includes analyzing the outputs of the parser in order to determine the identified endpoints.

Figure 6:
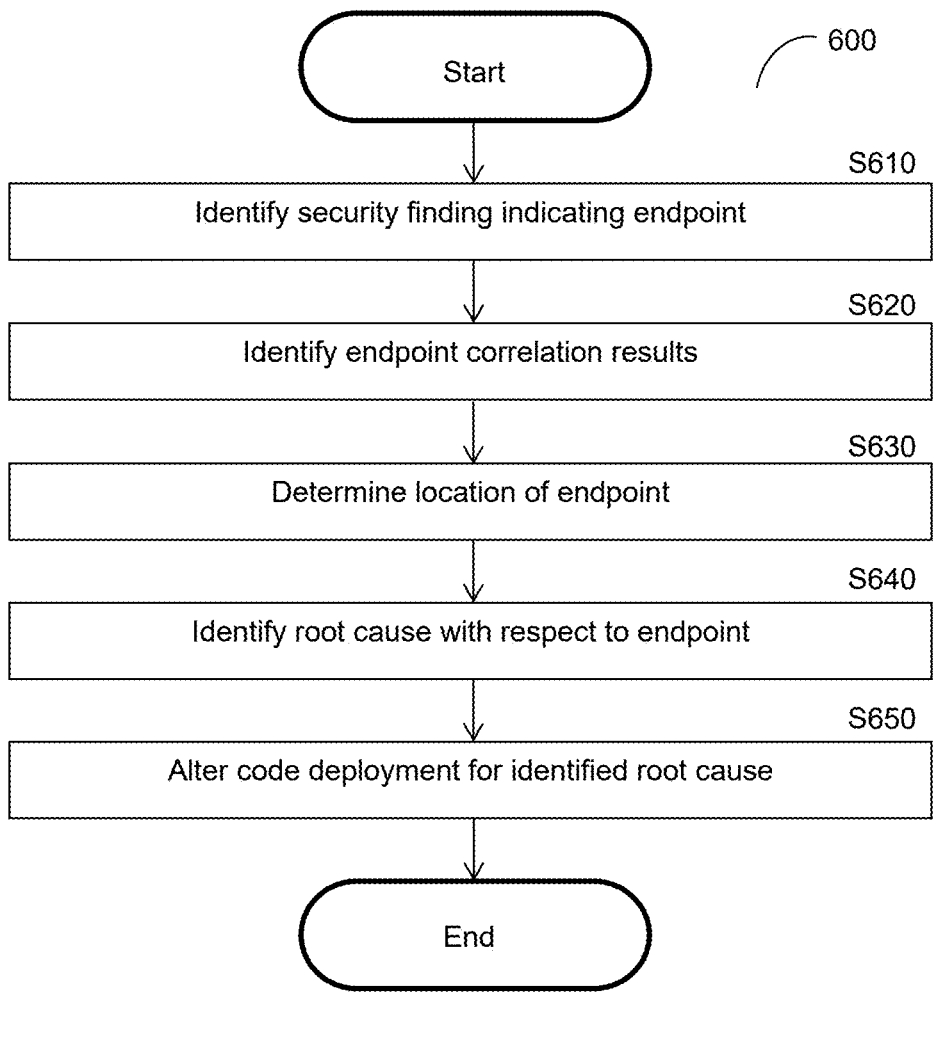
FIG. 6 is a flowchart illustrating a method for remediating a vulnerability using endpoint correlation results according to an embodiment.

FIG. 6 is a flowchart 600 illustrating a method for remediating a vulnerability using endpoint correlation results according to an embodiment. In an embodiment, the method is performed by the endpoint correlator 130, FIG. 1.

At S610, a security finding indicating an endpoint is identified. The security finding may be or may include, but is not limited to, an alert or other portion of data indicating an endpoint involved in a cybersecurity incident (e.g., a breach or ongoing cyberattack). The endpoint may be identified in such a security finding as, for example, an identifier of the endpoint. Such an identifier may be, but is not limited to, a name, an identification number, a network address (e.g., a network address that is unique to a given computing component), a combination thereof, and the like.

At S620, endpoint correlation results are identified for the endpoint indicated in the security finding. More specifically, endpoint correlation results including a location which was correlated to the endpoint indicated in the security finding may be identified based on an identifier of the endpoint included in the security finding. In an embodiment, the endpoint correlation results are determined as described above, for example with respect to FIGS. 3 and 5.

At S630, a location of the endpoint indicated in the security finding is determined based on the endpoint correlation results for that endpoint. As noted above, the endpoint correlation results may indicate a location which was correlated to a given endpoint such that the correlation results for the endpoint indicated in the security finding will identify the location of the endpoint.

At S640, a root cause is identified with respect to the identified endpoint. In an embodiment, the root cause is identified as a root cause entity, where the root cause entity is the entity indicated in the security finding. In a further embodiment, the root cause is further identified with respect to the location of the root cause entity.

At S650, a code deployment is altered for the identified root cause. In an embodiment, altering the code deployment at least includes altering deployment of code at the location of the root cause entity (e.g., the location identified at S630 or otherwise indicated in the correlation results). To this end, remediating the vulnerability may include, but is not limited to, removing code at the location (e.g., code containing a vulnerable line which references the endpoint indicated in the security finding), rebuilding one or more sets of code (e.g., software containers) deployed at the location, updating code deployed at the location or otherwise replacing code at the location with new code, combinations thereof, portions thereof, and the like.

Figure 7:
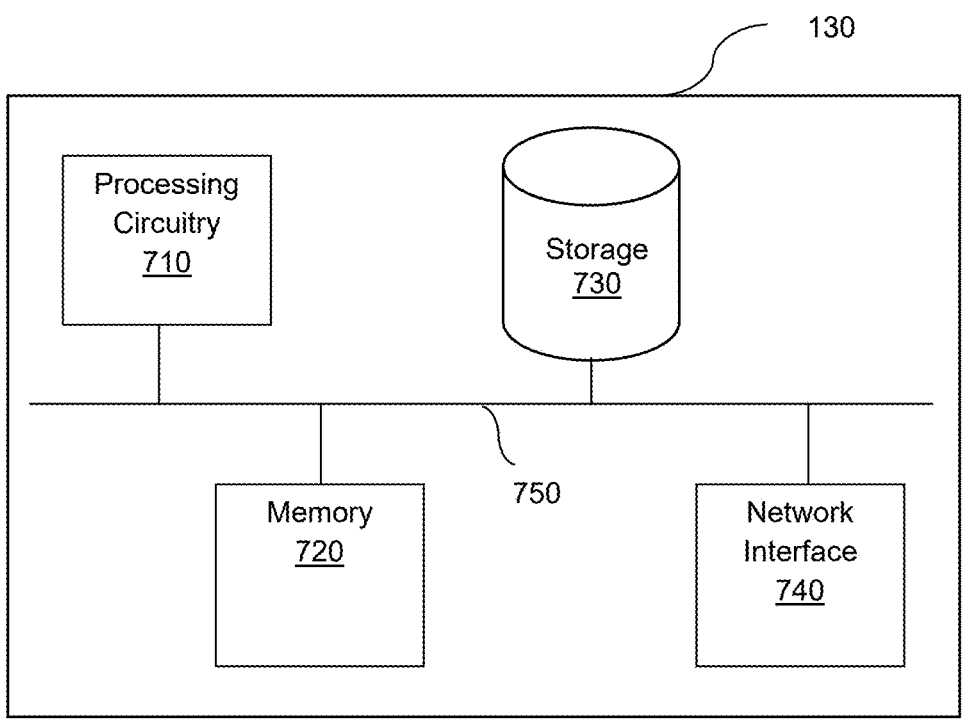
FIG. 7 is a schematic diagram of an endpoint correlator according to an embodiment.

FIG. 7 is an example schematic diagram of an endpoint correlator 130 according to an embodiment. The endpoint correlator 130 includes a processing circuitry 710 coupled to a memory 720, a storage 730, and a network interface 740. In an embodiment, the components of the endpoint correlator 130 may be communicatively connected via a bus 750.

The processing circuitry 710 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

The memory 720 may be volatile (e.g., random access memory, etc.), non-volatile (e.g., read only memory, flash memory, etc.), or a combination thereof.

In one configuration, software for implementing one or more embodiments disclosed herein may be stored in the storage 730. In another configuration, the memory 720 is configured to store such software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 710, cause the processing circuitry 710 to perform the various processes described herein.

The storage 730 may be magnetic storage, optical storage, and the like, and may be realized, for example, as flash memory or other memory technology, compact disk-read only memory (CD-ROM), Digital Versatile Disks (DVDs), or any other medium which can be used to store the desired information.

The network interface 740 allows the endpoint correlator 130 to communicate with other systems, devices, components, applications, or other hardware or software components, for example as described herein.

It should be understood that the embodiments described herein are not limited to the specific architecture illustrated in FIG. 7, and other architectures may be equally used without departing from the scope of the disclosed embodiments.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various embodiments disclosed herein can be implemented as hardware, firmware, software, or any combination thereof. Moreover, the software may be implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for endpoint identification:

obtaining outputs, at each iteration of a one or more iterations, from a language model based on a set of example code for a respective iteration in the one or more iterations, where the outputs include a set of expected results for the respective iteration and a first file for the respective iteration;

obtaining, at each iteration of the one or more iterations, a parser output for the respective iteration based on the first file for the respective iteration;

comparing, at each iteration of the one or more iterations, the set of the expected results for the respective iteration with the parser output of the respective iteration;

determining the outputs of the language model are refined based on the comparison;

querying the language model based on a code sample in order to obtain a second file;

obtaining a second parser output, via the parser, based on the second file; and identifying at least one endpoint based on the second parser output.

2. The method of claim 1, further comprising:

remediating a vulnerability based on the identified at least one endpoint.

3. The method of claim 2, wherein remediating the vulnerability further comprises altering a code deployment for the identified at least one endpoint.

4. The method of claim 1, further comprising:

correlating each endpoint in the at least one endpoint to a corresponding portion of the code sample, wherein the each endpoint in the at least one endpoint is identified based on a location of the corresponding portion of the code sample.

5. The method of claim 1, further comprising:

adding a postprocessing code to the second file, wherein the postprocessing code includes instructions for semantically analyzing a parse tree output, wherein the second file with the added postprocessing code is provided to the parser in order to obtain the second parser output.

6. The method of claim 1, wherein the parser is configured to parse streams of characters using grammar-based inputs.

7. The method of claim 1, further comprising:

identifying expected endpoints in the set of expected results for the respective iteration;

identifying parser endpoints in the parser output for the respective iteration; and matching expected endpoints in the set of expected results for the respective iteration with the parser endpoints in the parser output for the respective iteration.

8. The method of claim 7, further comprising:

determining the outputs of the language model are refined based on the matching being above a threshold number.

9. The method of claim 1, wherein the one or more iterations comprises at least two iterations.

10. A non-transitory computer readable medium having stored thereon instructions for causing a processing circuitry to execute a process, the process comprising:

obtaining outputs, at each iteration of a one or more iterations, from a language model based on a set of example code for a respective iteration in the one or more iterations, where the outputs include a set of expected results for the respective iteration and a first file for the respective iteration;

obtaining, at each iteration of the one or more iterations, a parser output for the respective iteration based on the first file for the respective iteration;

comparing, at each iteration of the one or more iterations, the set of the expected results for the respective iteration with the parser output of the respective iteration;

determining the outputs of the language model are refined based on the comparison;

querying the language model based on a code sample in order to obtain a second file;

obtaining a second parser output, via the parser, based on the second file; and identifying at least one endpoint based on the second parser output.

11. A system for endpoint identification, comprising:

a processing circuitry; and a memory, the memory containing instructions that, when executed by the processing circuitry, configure the system to:

obtain outputs, at each iteration of a one or more iterations, from a language model based on a set of example code for a respective iteration in the one or more iterations, where the outputs include a set of expected results for the respective iteration and a first file for the respective iteration;

obtain, at each iteration of the one or more iterations, a parser output for the respective iteration based on the first file for the respective iteration;

compare, at each iteration of the one or more iterations, the set of the expected results for the respective iteration with the parser output of the respective iteration;

determine the outputs of the language model are refined based on the comparison;

query the language model based on a code sample in order to obtain a second file;

obtain a second parser output, via the parser, based on the second file; and identify at least one endpoint based on the second parser output.

12. The system of claim 11, wherein the system is further configured to:

remediate a vulnerability based on the identified at least one endpoint.

13. The system of claim 12, wherein remediating the vulnerability further comprises altering a code deployment for the identified at least one endpoint.

14. The system of claim 11, wherein the system is further configured to:

correlate each endpoint in the at least one endpoint to a corresponding portion of the code sample, wherein the each endpoint in the at least one endpoint is identified based on a location of the corresponding portion of the code sample.

15. The system of claim 11, wherein the system is further configured to:

add a postprocessing code to the second file, wherein the postprocessing code includes instructions for semantically analyzing a parse tree output, wherein the second file with the added postprocessing code is provided to the parser in order to obtain the second parser output.

16. The system of claim 11, wherein the parser is configured to parse streams of characters using grammar-based inputs.

17. The system of claim 11, wherein the system is further configured to:

identify expected endpoints in the set of expected results for the respective iteration;

identify parser endpoints in the parser output for the respective iteration; and match expected endpoints in the set of expected results for the respective iteration with the parser endpoints in the parser output for the respective iteration.

18. The system of claim 17, wherein the system is further configured to:

determine the outputs of the language model are refined based on the match being above a threshold number.

19. The system of claim 11, wherein the one or more iterations comprises at least two iterations.

*   *   *   *   *